US009704050B2

(12) United States Patent
Lee et al.

(10) Patent No.: US 9,704,050 B2
(45) Date of Patent: Jul. 11, 2017

(54) SPECKLE-BASED AUTHENTICATION APPARATUS, AUTHENTICATION SYSTEM COMPRISING THE SAME, AND SPECKLE-BASED AUTHENTICATION METHOD

(71) Applicant: SAMSUNG ELECTRONICS CO., LTD., Suwon-si (KR)

(72) Inventors: Jaesoong Lee, Suwon-si (KR); Sungwoo Hwang, Seoul (KR); Jineun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/930,704

(22) Filed: Nov. 3, 2015

(65) Prior Publication Data

US 2016/0123874 A1 May 5, 2016

(30) Foreign Application Priority Data

Nov. 3, 2014 (KR) ........................ 10-2014-0151582

(51) Int. Cl.
*G06K 9/74* (2006.01)
*G06K 9/00* (2006.01)

(52) U.S. Cl.
CPC ..... *G06K 9/00885* (2013.01); *G06K 9/00577* (2013.01); *G06K 2009/00932* (2013.01)

(58) Field of Classification Search
CPC ..... G01N 2001/028; G01N 2021/1734; G01N 2021/6417; G01N 21/293; G01N 21/31;
(Continued)

(56) References Cited

U.S. PATENT DOCUMENTS 3,668,633 A * 6/1972 Sadowsky .......... G06K 9/00013
250/227.26
6,744,909 B1 * 6/2004 Kostrzewski ........... G06E 3/001
356/71
(Continued)

FOREIGN PATENT DOCUMENTS

JP 2008-217307 A 9/2008
JP 5096168 B2 12/2012
(Continued)

OTHER PUBLICATIONS

Pappu, Ravikanth et al., "Physical One-Way Functions", Science, vol. 297, Sep. 20, 2002, pp. 2026-2030, 6 pages total.
(Continued)

*Primary Examiner* — Michael P Stafira
(74) *Attorney, Agent, or Firm* — Sughrue Mion, PLLC

(57) ABSTRACT

Provided are a speckle-based authentication apparatus, an authentication system that includes the speckle-based authentication apparatus, and an authentication method using the speckle-based authentication apparatus. The speckle-based authentication apparatus includes an optical source configured to radiate light onto an object that is placed apart from the optical source; and a detector configured to detect a speckle pattern generated from the object in response to the light being radiated onto the object and detect location information of the object. Thus, the object is authenticated by comparing the speckle pattern detected by the detector with a speckle pattern stored in advance.

21 Claims, 4 Drawing Sheets

(58) Field of Classification Search
CPC ............ G01N 21/3563; G01N 21/359; G01N 21/6428; G01N 21/643; G01N 21/645; G01N 21/65; G01N 21/84; G01N 21/8507; G01N 21/885
See application file for complete search history.

(56) References Cited

U.S. PATENT DOCUMENTS

| | | | |
|---|---|---|---|
| 6,970,234 B2* | 11/2005 | Nagasaka | G06K 9/00013 356/71 |
| 7,351,374 B2 | 4/2008 | Stark | |
| 7,817,256 B2* | 10/2010 | Fujii | A61B 5/0261 356/39 |
| 7,925,056 B2 | 4/2011 | Presura et al. | |
| 8,054,098 B2 | 11/2011 | Koushanfar et al. | |
| 8,494,228 B2 | 7/2013 | Fujii et al. | |
| 2008/0008365 A1 | 1/2008 | Hikita et al. | |
| 2011/0235871 A1* | 9/2011 | Byren | G06K 9/2036 382/124 |
| 2014/0085191 A1 | 3/2014 | Gonion et al. | |
| 2014/0098058 A1* | 4/2014 | Baharav | G06F 3/0421 345/174 |
| 2015/0309662 A1* | 10/2015 | Wyrwas | G06F 3/0421 345/175 |
| 2015/0310251 A1* | 10/2015 | Wyrwas | G06F 21/32 348/77 |

FOREIGN PATENT DOCUMENTS

| | | |
|---|---|---|
| KR | 10-2010-0046527 A | 5/2010 |
| WO | 2006/049396 A1 | 5/2006 |

OTHER PUBLICATIONS

Yeh, Chia-Hung, et al., "Robust laser speckle recognition system for authenticity identification", Optics Express, vol. 20, No. 22, Oct. 22, 2012, pp. 24382-24393.

* cited by examiner

SPECKLE-BASED AUTHENTICATION APPARATUS, AUTHENTICATION SYSTEM COMPRISING THE SAME, AND SPECKLE-BASED AUTHENTICATION METHOD

CROSS-REFERENCE TO RELATED PATENT APPLICATION

This application claims priority from Korean Patent Application No. 10-2014-0151582, filed on Nov. 3, 2014 in the Korean Intellectual Property Office, the disclosure of which is incorporated herein in its entirety by reference.

BACKGROUND

1. Field

Apparatuses and methods consistent with exemplary embodiments relate to user authentication, and more particularly, to laser spackle-based user authentication.

2. Description of the Related Art

Along with the global economic and social developments, methods of payment for purchased goods have been gradually developed. As a result, new payment methods, such as use of credit cards and e-money, have appeared. However, in this case, the management of personal information has become a social issue and a method of inputting an identifier (ID) and a password may not be sufficient for authenticating personal information and keeping it safe and secure.

Accordingly, there is a need to develop an authentication system for detecting a specific signal and decoding the same when personal information is required to identify a user, while keeping the personal information of the user secure. A biometric authentication system has been mainly used as an authentication signal. An example of a biometric authentication system is a personal authentication system that recognizes a pattern such as a fingerprint or iris of a specific body part.

A fingerprint recognition system generally includes a fingerprint recognition sensor and a signal processing unit. In order to configure a fingerprint recognition system having a high recognition rate and a low error rate, the system may need to acquire a high quality image of a fingerprint, and accordingly, such a fingerprint recognition apparatus has to include many parts, thereby having complicated structure.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide speckle-based authentication apparatuses having a relatively simple configuration and high reliability by using a speckle pattern of an object.

Further, one or exemplary embodiments provide authentication systems including the speckle-based authentication apparatus that uses a speckle pattern.

Still further, one or exemplary embodiments provide methods of authentication by using a speckle to detect a speckle pattern of an object and a location of the object.

According to an aspect of an exemplary embodiment, there is provided a speckle-based authentication apparatus including: an optical source configured to radiate light onto an object that is placed apart from the optical source; and a detector configured to detect a speckle pattern generated from the object in response to the light being radiated onto the object and detect location information of the object.

The optical source may be further configured to control a radiation angle of the light radiated onto the object from the optical source.

The optical source may include a plurality of optical sources.

The plurality of optical sources may include first and second optical sources that respectively radiate lights having different wavelengths from each other.

The detector may include a plurality of detectors.

The optical source may include first and second optical sources and the detector may include first and second detectors. The first detector may detect a first speckle pattern generated from the object in response to light emitted from the first optical source being incident onto the object, and the second detector may detect a second speckle pattern generated from the object in response to light emitted from the second optical source being incident onto the object.

The detector may further include a lens.

The speckle-based authentication apparatus may further include a cradle on which the object is to be seated.

The cradle may include: a height controller that controls a separation distance from the optical source or the detector to the object; and a seating unit on which the object is to be seated.

The cradle may be attachable to and detachable from the authentication apparatus.

The optical source may radiate light having a coherent wave.

The detector may include a photo diode, a charge-coupled device, or a complementary metal-oxide semiconductor (CMOS) image sensor.

An authentication system may include the speckle-based authentication apparatus.

The authentication system may further include: a controller configured to control the optical source and the detector; and a storage configured to store the speckle pattern detected by the detector or a value of a comparison result between the detected speckle pattern and a speckle pattern obtained in advance.

The authentication system may further include a display that visually display the detected speckle pattern or output the comparison result between the detected speckle pattern and the speckle pattern obtained in advance.

According to an aspect of another exemplary embodiment, there is provided a method of authenticating an object including: radiating light, by an optical source, onto an object that is placed apart from the optical source; detecting, by a detector, a speckle pattern generated from the object in response to the light being radiated onto the object; detecting, by the detector, location information of the object in relation to at least one of the optical source and the detector; and comparing the speckle pattern and the location information detected by the detector with a speckle pattern stored in advance.

The detecting the location information may include detecting the location information based on the detected speckle pattern.

The method may further include comparing the detected speckle pattern and the stored speckle pattern in response to the detected location information being substantially the same as location information of the stored speckle pattern.

The radiating the light may include radiating the light onto the object while changing an radiation angle of the optical source.

The detected speckle pattern may include a first speckle pattern that is generated from the object in response to light being emitted from a first optical source of the optical source and being detected by a first detector of the detector, and the detected speckle pattern may include a second speckle pattern that is generated from the object in response to light being emitted from a second optical source of the optical source and being detected by a second detector of the detector.

According to an aspect of another exemplary embodiment, there is provided a user authentication apparatus including: an optical source configured to radiate light onto a target object; a detector configured to detect the light radiated and bounced off the target object and obtain a speckle pattern from the detected light; and a controller configured to determine a distance between the object and the detector and perform user authentication based on the obtained speckle pattern in response to the determined distance being within a threshold distance range.

The controller may set the threshold distance range in accordance with a security level for the user authentication.

The user authentication apparatus may further include a display that displays a position of the target object in relation to the threshold distance range.

According to an aspect of an exemplary embodiment, an speckle-based authentication apparatus includes: an optical source unit that irradiates light onto an object; and a detector unit that is configured separately from the optical source unit, wherein the detector unit detects speckle information generated from the object in response to the light irradiated onto the object and location information of the object.

An irradiation angle of the light irradiated onto the object from the optical source unit may be controlled.

The optical source unit may include a plurality of optical sources.

The optical source unit may include first and second optical source units that respectively irradiate lights having different wavelengths from each other.

The detector unit may include a plurality of detectors.

The optical source unit may include the first and second optical source units and the detector unit may include first and second detector units, wherein the first detector unit detects a first speckle pattern generate from the object in response to light emitted from the first optical source unit, and the second detector unit detects a second speckle pattern generate from the object in response to light emitted from the second optical source unit.

The detector unit may further include a lens.

The speckle-based authentication apparatus may further include a cradle on which the object is seated.

The cradle may include: a height controller that controls a separation distance from the optical source unit or the detector unit to the object; and a seating unit on which the object is seated.

The cradle may be attachable to and detachable from the speckle-based authentication apparatus.

The optical source unit may irradiate light having a coherent wave.

The detector unit may include a photo diode, a charge-coupled device, or a CMOS image sensor.

According to an aspect of an exemplary embodiment, an authentication system that includes the speckle-based authentication apparatus described above.

The authentication system may further include: a controller configured to control the optical source unit and the detector unit; and a storage unit configured to store a speckle pattern detected by the detector unit or a value of a comparison result between the detected speckle pattern and a speckle pattern obtained in advance.

The authentication system may further include a display configured to visually display a speckle pattern detected by the detector unit or to output the comparison result between the detected speckle pattern and the speckle pattern obtained in advance.

According to an aspect of an exemplary embodiment, a method of authenticating an object, includes: detecting a speckle pattern generated from an object and location information of the object by irradiating light onto the object from an optical source unit; and comparing the speckle pattern and the location information detected by the detector unit with a speckle pattern stored in advance.

The location information of the object may be detected by the speckle pattern that is generated from the object by light irradiated onto the object.

When the location information of a speckle pattern detected by the detector unit is substantially the same as the location information of a stored speckle pattern, the detected speckle pattern and the stored speckle pattern may be compared.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
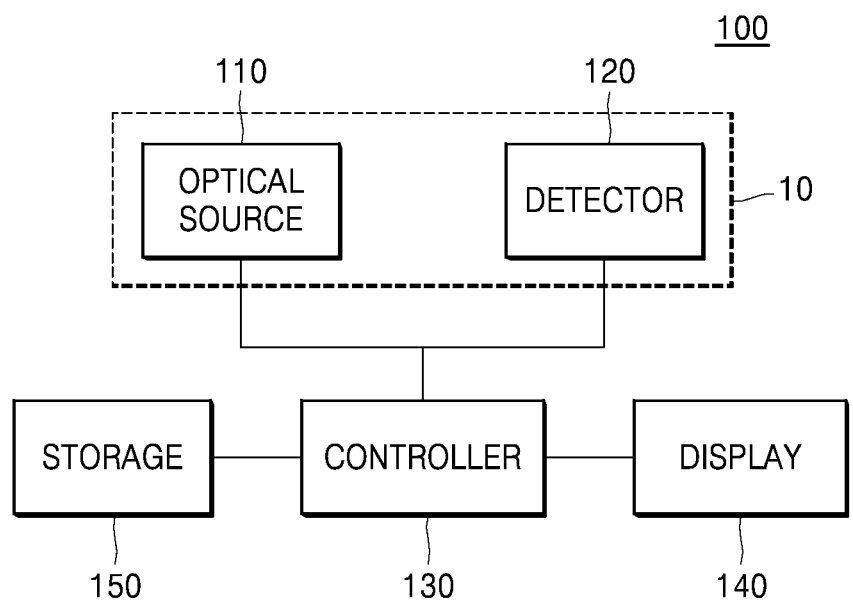
FIG. 1 is a block diagram of a speckle-based authentication apparatus and an authentication system having the speckle-based authentication apparatus according to an exemplary embodiment exemplary.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

A speckle-based authentication apparatus that uses a speckle, an authentication system having the speckle-based authentication apparatus, and a method of authentication will now be described in detail according to exemplary embodiments.

FIG. 1 is a block diagram of a speckle-based authentication apparatus 10 and an authentication system 100 having the speckle-based authentication apparatus 10 according to an exemplary embodiment.

Referring to FIG. 1, the speckle-based authentication apparatus 10 that uses a laser speckle may include an optical source (e.g., an optical transmitter) 110 that radiates light to at least a region of a target object. The apparatus 10 may further include a detector (e.g., an optical receiver) 120 that is paired with the optical source 110 and detects a speckle pattern that is generated from the object by the radiated light. The authentication system 100 according to the exemplary embodiment may include the optical source 110, the detector 120, a controller 130 that controls the optical source 110 and the detector 120. The controller 130 may perform classification of speckle patterns, comparison of a detected speckle pattern with a speckle pattern obtained in advance, and image processing of the speckle pattern by using speckle patterns received from the detector 120. For example, the controller 130 may determine a distance between the target object and the detector 120 and perform user authentication based on the detected speckle pattern only when the determined distance is within a certain distance range (e.g., a predetermined threshold distance range). Also, the authentication system 100 may include a display 140 that visually displays a detected speckle pattern or displays a comparison result between a detected speckle pattern and a speckle pattern obtained in advance. Further, the display 140 may display a current position of the target object in relation to the threshold distance range. The authentication system 100 may further include a storage 150 that stores a detected speckle pattern or a value of comparison between a detected speckle pattern and a speckle pattern obtained in advance.

The target object may have a surface at which light incident from the optical source 110 of the speckle-based authentication apparatus 10 according to the exemplary embodiment is scattered. The target object may be a human or an animal and may include a portion of a human or an animal. However, the target object according to the exemplary embodiment is not limited thereto as long as the object can generate a speckle pattern by being radiated light. The target object may have a surface that has a shape changing relatively little according to time, and may be a portion of a body, such as a fingerprint that changes relatively little according to time, and thus, is distinguishable from other person. Light may be radiated onto the target object from the optical source 110 by being separated from the speckle-based authentication apparatus 10 according to the exemplary embodiment. Hereinafter, in the current exemplary embodiment, a finger is used as the target object, and thus, the speckle-based authentication apparatus 10 that uses a fingerprint speckle, the authentication system 100 using the speckle-based authentication apparatus 10, and an authentication method will be described with a finger as the target object.

The optical source 110 is not limited to a certain type of a laser emitter, and any light source that may radiate a coherent-wave light with respect to the target object may be used. For example, the optical source 110 may include a laser diode (LD). The optical source 110 may further include a beam shaper disposed on a light emitter, and light emitted from the optical source 110 may be radiated onto the object through the beam shaper. The wavelength of light emitted from the optical source 110 may be determined according to the surface shape of the object. For example, if the object has a small size surface rippling, the optical source 110 may be selected to emit light having a relatively short wavelength of visible light, that is, a blue laser. Also, light emitted from the optical source 110 may be infrared rays or near infrared rays, and there is no specific limitation in light emission.

The detector 120 may detect a speckle signal generated from the object and may include an image sensor. For example, the detector 120 may be a photodiode, a charge-coupled device (CCD), or a complementary metal-oxide semiconductor (CMOS) image sensor (CIS). The detector 120 may include a plurality of image sensors formed in a one-dimensional (1D) or two-dimensional (2D) array structure. The detector 120 may measure location information together with speckle information from the object. That is, the detector 120 may measure a speckle pattern generated from the object, and also, location information of the object from the detector 120, that is, a distance and an angle between the detector 120 and the object may be detected.

The speckle-based authentication apparatus 10 that uses a speckle according to the current embodiment may include the optical source 110 and the detector 120, and a distance between the optical source 110 and the detector 120 may be additionally controlled. The speckle-based authentication apparatus 10 includes the optical source 110 and the detector 120, and may be formed as a shape of housing that is formed of an insulating material, plastic, rubber, polymer, or a metal, and may be used by being employed in other devices or products. For example, the speckle-based authentication apparatus 10 may be used by being employed in a wearable device, being mounted on a mobile device that includes a mobile phone, or being mounted on a gate or a casher.

Figure 2A:
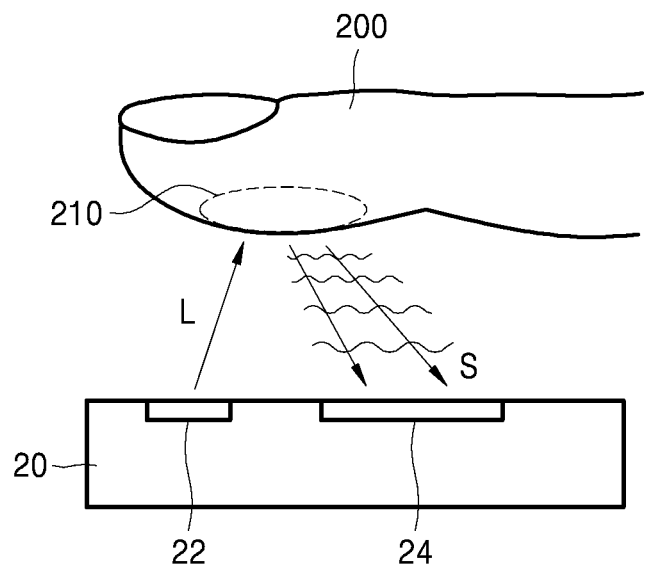
FIG. 2A is cross-sectional view illustrating a method of obtaining a speckle pattern of a fingerprint by using a speckle-based authentication apparatus that uses a speckle according to an exemplary embodiment.
Figure 2B:
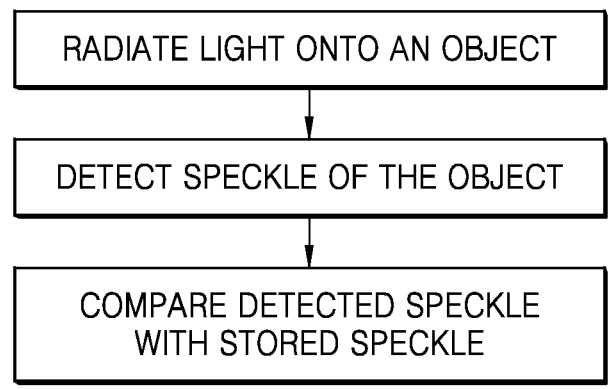
FIG. 2B is a block diagram illustrating a method of authentication by using a speckle according to an exemplary embodiment.

FIG. 2A is cross-sectional view illustrating a method of obtaining a speckle pattern of a fingerprint by using a speckle-based authentication apparatus 20 that uses a speckle according to an exemplary embodiment. FIG. 2B illustrates a method of authentication by using a speckle according to an exemplary embodiment.

Referring to FIGS. 2A and 2B, the speckle-based authentication apparatus 20 that uses a speckle according to an exemplary embodiment may include an optical source 22 and a detector 24, and light L is radiated onto a region of interest (ROI) 210 of an object 200 from the light source 22. The ROI 210 may be also referred to as a fingerprint region 210. Light L emitted from the optical source 22 may be coherent-wave light. Once the light L reaches the fingerprint region 210, the light L is scattered by the fingerprint region 210, and thus, a speckle pattern S may be generated. The speckle pattern S may be an electromagnetic wave having coherence, and may be scattered light L at the fingerprint region 210 that has a rippling shape of the object 200. The speckle pattern S may be formed by light L scattered from the fingerprint region 210 of the object 200 and may be detected by the detector 24 of the speckle-based authentication apparatus 20 through a constructive interference and a destructive interference. The surface of the fingerprint region 210 may be very rough on the scale of an optical wavelength. When the nearly monochromatic light L is reflected from the surface of the fingerprint region 210, the optical wave resulting at the distance of the detector 120 may consist of many coherent wavelets, each arising from a different friction ridge on the fingerprint region 210. Since the distances traveled by these various wavelets may differ by several wavelengths, the interference of the wavelets of various phases results in the granular pattern of intensity called a speckle pattern.

The speckle-based authentication apparatus 20 according to the current exemplary embodiment may measure the speckle pattern of an object 200 and the location information of the object 200. A speckle pattern having a coherent electromagnetic characteristic that is generated according to the surface shape of the object 200 may be detected by the detector 24, and the interference pattern of the speckle pattern may vary according to the location of the object 200. That is, as the location of the detector 24 with respect to the object 200 varies, speckle patterns different from each other may be obtained. The speckle-based authentication apparatus 20 that uses a speckle may measure not only a speckle pattern of the object 200, but also location information of the object 200 together with the speckle pattern, which will be described with reference to FIGS. 3A and 3B.

Figure 3A:
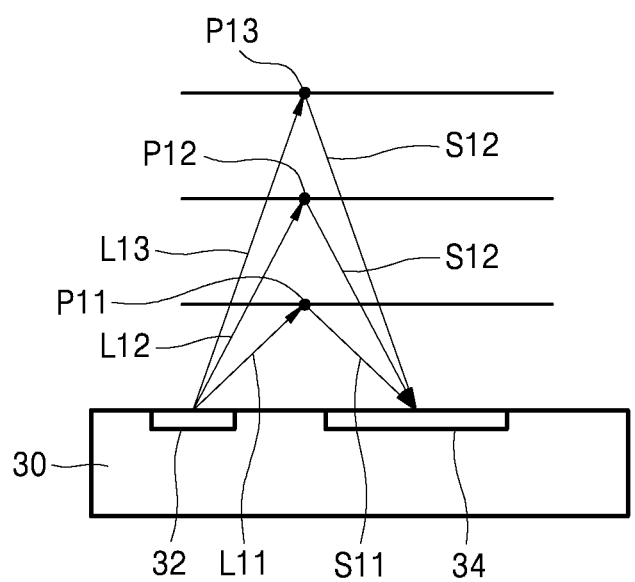
FIG. 3A is a cross-sectional view illustrating a method of obtaining a speckle pattern according to location using a speckle-based authentication apparatus that uses a speckle according to an exemplary embodiment.

FIG. 3A is a cross-sectional view illustrating a method of obtaining a speckle pattern according to location using a speckle-based authentication apparatus 20 that uses a speckle according to an exemplary embodiment.

Referring to FIGS. 2A and 3A, the object 200 may be located with various distances and angles from a speckle-based authentication apparatus 30. For example, the object 200 may be located at a first location P11, a second location P12, or a third location P13. In FIG. 3A, the object 200 is illustrated as being located between an optical source 32 and a detector 34. However, the location of the object 200 is not limited to the first location P11, the second location P12, and the third location P13, and may be located on an upper right side of the optical source 32 or on an upper left side of the detector 34. If the object 200 is located at the first location P11, a first speckle pattern S11 that is formed by a first light L11 radiated from the optical source 32 is detected by the detector 34, and when the object 200 is located at the second location P12, a second speckle pattern S12 that is formed by a second light L12 radiated from the optical source 32 is detected by the detector 34. Also, when the object 200 is located at the third location P13, a third speckle pattern S13 that is formed by a third light L13 radiated from the optical source 32 is detected by the detector 34.

The first location P11, the second location P12, and the third location P13 are different locations from each other in a space, and distances from the detector 34 of the speckle-based authentication apparatus 30 may also be different from each other. Accordingly, the speckle patterns S11, S12, and S13 that are respectively obtained from the first location P11, the second location P12, and the third location P13 may have different information from each other, and may show different results from each other when the object 200 is identified. In identifying the object 200 by using the speckle-based authentication apparatus 30 according to the current exemplary embodiment, while measuring a speckle pattern of the object 200, information related to the location of the object 200 may also be obtained, which will be described below.

Figure 3B:
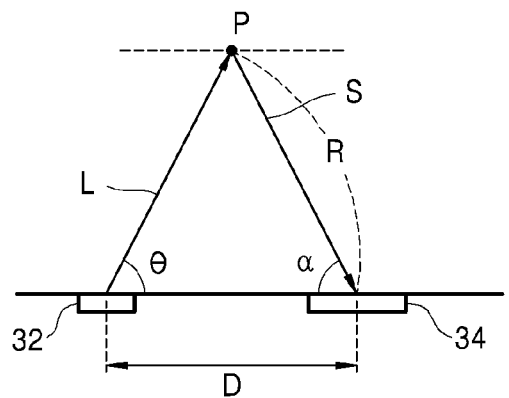
FIG. 3B is a schematic drawing illustrating a method of measuring a location of an object with respect to a speckle-based authentication apparatus according to an exemplary embodiment.

FIG. 3B is a schematic drawing illustrating a method of measuring a location of the object 200 with respect to the speckle-based authentication apparatus 30 according to an exemplary embodiment.

Referring to FIGS. 2A and 3B, the object 200 may be located at a predetermined location P by being separated from the detector 34, and a distance between the object 200 and the detector 34 is R. When light L is radiated onto the location P of the object 200 from the optical source 32, a speckle pattern S is generated from the object 200 and is detected by the detector unit 34. A line that connects the optical source 32 and the detector 34 is referred to as a reference line. A distance between the optical source 32 and the detector 34 is D. An angle that is formed between the line that connects the optical source 32 and the object 200 and the reference line that connects the optical source 32 and detector 34, or an angle that is formed between light L that is radiated to the location P of the object 200 and the reference line is referred to as θ. An angle that is formed between a line that connects the object 200 and the detector 34 and the reference line or an angle that is formed between a reflecting direction of a speckle pattern S that incident to the detector 34 with respect to the reference line is referred to as α. The distance R from the location P of the object 200 to the detector 34 may be calculated by Equation 1.

$$R = D \times \tan\theta / (\sin(\alpha) + \tan(\theta)\cos(\alpha)) \quad \text{[Equation 1]}$$

After measuring a distance D between the optical sourcet 32 and the detector 34, an angle θ that is formed between the reference line and light L that is radiated from the optical source 32 to the location P of the object 200, and a that is formed between the reference line and a line that connects the location P of the object 200 to the detector 34, and the distance R between the object 200 and the detector 34 is calculated. And as a result, information related to the location P of the object 200 may be obtained. In order to obtain location information of the location P of the object 200, light L that is emitted from the optical source 32 and is used for obtaining a speckle pattern S of the object 200 may be used for measuring the angles.

An additional light may be radiated from the optical source 32 with respect to the object 200, and light reflected from the object 200 may be used for measuring the angles.

Referring to FIGS. 2A and 2B, a speckle pattern S generated from the fingerprint region 210 of the object 200 may be detected by the detector 24. As described above, the speckle pattern S obtained in this way may be a coherent pattern that is determined according to the location of the object 200 with respect to the surface shape of the object 200 and the detector 24. The speckle pattern S detected by the detector 24 may be compared by the controller 130 with a speckle pattern that is stored in advance in the storage 150 (refer to FIG. 1), and thus, the similarities between the speckle patterns may be confirmed.

In order to compare the detected speckle pattern S and the speckle pattern stored in the storage 150, it is based that the location information of the speckle patterns S is the same. When the speckle pattern S detected by the detector 24 is referred to as a detected speckle pattern and the speckle pattern stored in the storage 150 is referred to as a stored speckle pattern, and when the detected speckle pattern and the stored speckle pattern are compared, the similarity between the detected speckle pattern and the stored speckle pattern may be determined in the case when the location information of the detected speckle pattern and the location information of the stored speckle pattern are substantially the same. In comparison of the location information between the detected speckle pattern and the stored speckle pattern, the distance R between the object 200 and the detector 34, an angle θ that is formed between a line that connects the optical source 32 and the location P of the object 200 and the reference line that connects the optical source 32 and the detector 34, and an angle α that is formed between a line that connects the object 200 and the detector 34 and the reference line may be compared. The speckle patterns may be compared when a distance R between the object 200 and the detector 34, an angle θ, and angle α of the detected speckle pattern and the stored speckle pattern are substantially the same. When the distance R, an angle θ, and angle α of the detected speckle pattern and the stored speckle pattern are compared, when not only the values of the distance R, the angle θ, and the angle α are completely equal, but also differences of the values fall in a predetermined deviation range, for example, in a range from about 5% to about 10%, it may be determined as the detected speckle pattern and the stored speckle pattern have equal characteristics. As a result of the comparison, when the detected speckle pattern and the stored speckle pattern are determined as speckle patterns having substantially the equal characteristics, it may be authenticated that the detected speckle pattern and the stored speckle pattern are originated from the same object 200.

Here, as the location information of the speckle pattern S, the distance R between the object 200 and the detector 34, the angle θ that is formed between the reference line that connects the optical source 32 and the detector 34 and the line that connects the optical source 32 and the location P of the object 200 or the angle α that is formed between the reference line and the line that connects the object 200 and the detector 34 are described. However, the location information of the object 200 according to the current exemplary embodiment is not limited thereto. That is, an authentication level or a security level of the object 200 may be set by default or a user input, and according to the level, the type of location information that is considered when the speckle patterns are compared and value differences between the location information may be controlled. For example, if the authentication level is set low, only the distance R between the object 200 and the detector 34 may be used as location information when the detected speckle pattern and the stored speckle pattern are compared. When the value difference is 10% or less, it is determined that the location information is substantially the same. Also, when the authentication level is set relatively high, the location information that is used for comparing the detected speckle pattern and the stored speckle pattern may be used even the angles θ and α in addition to the distance R between the object 200 and the detector 34, and when the value differences of the location information are 5% or less, the location information may be considered as substantially the same. Here, the value differences of the location information are exemplary, and thus, are not limited thereto. When speckle patterns are compared, a deviation range of the location information and location information values for determining as substantially the same may be controlled by the user.

The storage 150 may store a measuring time of the detected speckle pattern and the stored speckle pattern together with the comparison results of the speckle patterns. If speckle pattern information of the object 200 is not stored in advance in the storage 150, a process of registering a speckle information of the object 200 in the storage 150 may be performed without having a process of comparing the speckle pattern. In the case that a speckle pattern of the object 200 is stored or registered in advance in the storage 150 as shown in FIG. 1, together with the speckle pattern of the object 200, as location information, the distance R between the object 200 and the detector 34, the angle θ that is formed between the reference line that connects the optical source 32 and the detector 34 and the line that connects the optical source 32 and the location P of the object 200, or the angle α that is formed between the reference line and the line that connects the object 200 and the detector 34 may also be stored in the storage 150.

In the case of a fingerprint recognition method that is generally used as an authentication method, a specific individual fingerprint pattern is registered in a fingerprint recognition system of a storing apparatus, and thus, there is a concern of leaking the personal information. However, if the authentication system that uses a speckle according to the current embodiment is used, concerns about the leakage of personal information is relatively low when compared to the fingerprint recognition system since the fingerprint pattern itself is not stored, but a speckle pattern having various interference patterns is stored according to location information, such as a distance between a fingerprint and a detector or angles.

FIGS. 4 through 7 are cross-sectional views of a speckle-based authentication apparatus that uses a speckle according to another exemplary embodiment.

Figure 4:
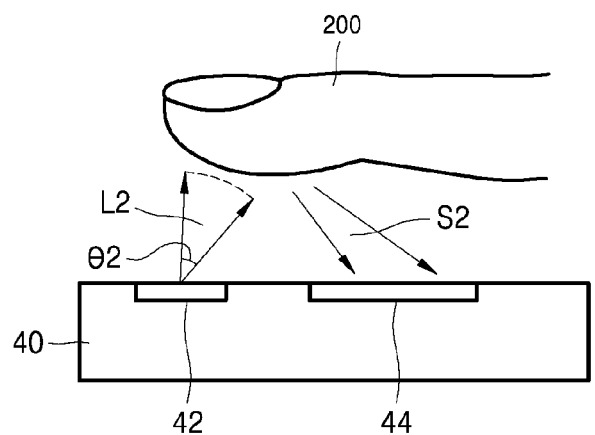
FIGS. 4 through 7 are cross-sectional views of a speckle-based authentication apparatus that uses a speckle according to another exemplary embodiment.

FIG. 4 shows an example of detecting a speckle signal by a detector 44 by changing an angle of light L2 that is radiated onto the object 200 from an optical source 42.

Referring to FIG. 4, a speckle-based authentication apparatus 40 that uses a speckle may include the optical source 42 that radiate light L2 onto the object 200, and the detector 44 that detects a speckle pattern S2 generated from the object 200. Light L2 emitted from the optical source 42 may be radiated onto the object 200 by controlling an angle of the direction of light-emission as much as θ2. The optical source 42 may be a laser diode that may emit a laser having a narrow light-width, and also, may include an angle controller to control a radiation angle of light L2 emitted from the optical source 42. Speckle patterns S2 of the object 200 at various angles may be obtained by changing angles of light L2 radiated onto the object 200. Also, even in the case when a distance between the object 200 and the detector 44 is equal to the distance of the stored speckle pattern, various speckle patterns S2 may be obtained, and thus, when an authentication with respect to the object 200 is performed, the reliability of the authentication may be increased.

Figure 5:
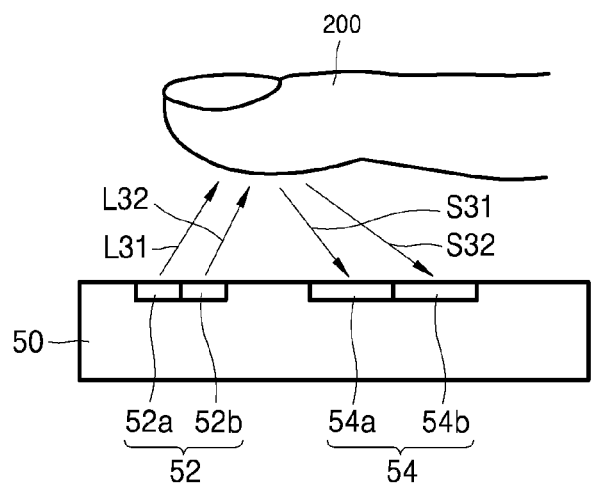

FIG. 5 is a schematic cross-sectional view of a speckle-based authentication apparatus 50 having at least first and second optical sources 52a and 52b and first and second detectors 54a and 54b.

Referring to FIG. 5, the speckle-based authentication apparatus 50 may include the first and second optical sources 52a and 52b that respectively radiate first and second light L31 and L32 onto the object 200, and also, may include the first and second detectors 54a and 54b that measure or detect first and second speckle patterns S31 and S32 that are generated from the object 200. The first optical source 52a may radiate first light L31 onto the object 200, and the first detector 54a may detect the first speckle pattern S31 generated from the object 200. Also, the optical source 52b may radiate second light L32 onto the object 200, and the second optical source 52b may measure the second speckle pattern S32 generated from the object 200. However, the optical source 52 and the detector 54 according to the current embodiment are not limited thereto, that is, more than two optical sources 52 and more than two detectors 54 may be formed. Also, a single optical source 52 and more than two detectors 54 may be formed, and also, more than two optical sources 52 and a single detector 54 may be formed.

The first and second optical sources 52a and 52b may simultaneously radiate light L31 and L32 onto the object 200, and in this case, the first and second detectors 54a and 54b may simultaneously measure the first and second speckle patterns S31 and S32. Also, the first and second optical sources 52a and 52b may sequentially radiate first and second light L31 and L32 onto the object 200 and the first and second detectors 54a and 54b may sequentially measure the first and second speckle patterns S31 and S32, respectively.

The optical source 52 may select, for example, a wavelength range according to the object 200. When the optical source 52 includes a plurality of optical sources, the optical sources may have different light-emitting wavelengths from each other. For example, the first optical source 52a may emit a blue laser, and the second optical source 52b may emit a red laser. When the detector 54 includes more than two detectors, the speckle signals detected by the different detectors may be different from each other. The first and second speckle patterns S31 and S32 detected by the first and second detectors 54a and 54b may have various shapes.

Figure 6:
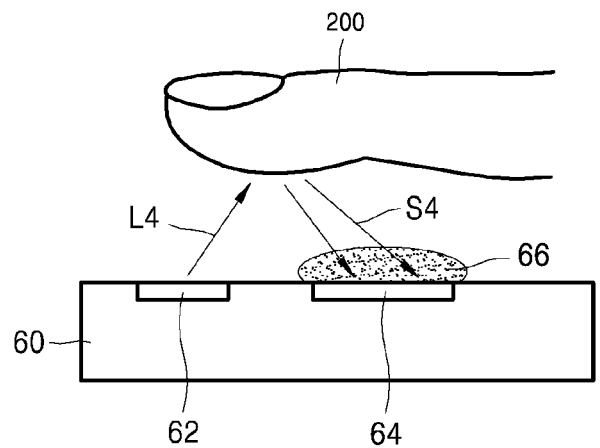

FIG. 6 is a cross-sectional view of a speckle-based authentication apparatus 60 in which a lens 66 is formed on a detector 64.

Referring to FIG. 6, the speckle-based authentication apparatus 60 may include an optical source 62 that radiate light L4 onto the object 200 and the detector 64 that measures or detects a speckle pattern S4 generated from the object 200. Also, the lens 66 may be provided on a surface of the detector 64 that detects the speckle pattern S4. When light L4 is radiated onto the object 200 from the optical source 62, the speckle pattern S4 may be formed from the object 200, and the speckle pattern S4 may be detected by the detector 64 by being focused through the lens 66 formed on the detector 64. A further correct measuring of the speckle pattern S4 is possible by forming the lens 66 on the detector 64.

Figure 7:
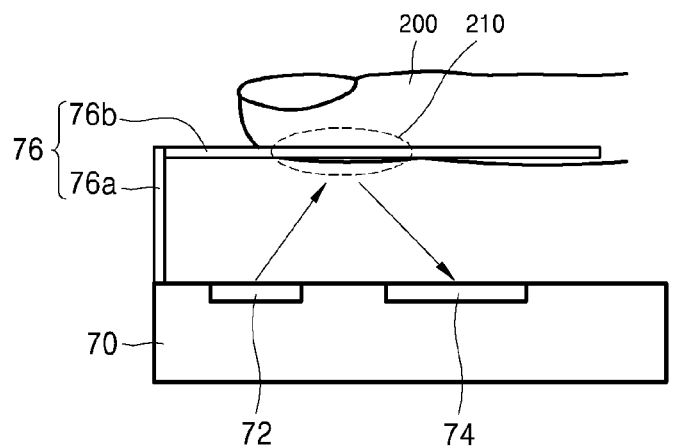

FIG. 7 is a cross-sectional view of a speckle-based authentication apparatus 70 having a cradle 76 for the object 200 according to an exemplary embodiment. The cradle 76 may be part of the speckle-based authentication apparatus 70. Alternatively, the cradle 76 may be provided separately from the speckle-based authentication apparatus 70.

Referring to FIG. 7, the speckle-based authentication apparatus 70 that uses a speckle according to the exemplary embodiment may include an optical source 72 that radiates light onto the speckle-based authentication apparatus 70 and a detector 74 that detects a speckle pattern generated from the object 200. The cradle 76 on which the object 200 is seated may be formed on the speckle-based authentication apparatus 70. The cradle 76 may include a height controller 76a and a seating unit 76b. The height controller 76a may control a height of the seating unit 76b from the optical source 72, the detector 74, or a surface of the speckle-based authentication apparatus 70. The object 200 may be seated on the seating unit 76b. A distance according to a height between at least a region of the object 200, for example, the fingerprint region 210, and the detectort 74 may be predetermined calculated.

The object 200 may be placed on an upper surface of the seating unit 76b, and the fingerprint region 210 of the object 200 may be formed to face the optical source 72 and the detector 74 of the speckle-based authentication apparatus 70. The seating unit 76b may have a hole through which a region of the object 200, for example, the fingerprint region 210 is exposed towards the optical source 72 and the detector 74 that are located below the seating unit 76b. The fingerprint region 210 of the object 200 may be placed on the hole of the seating unit 76b. Also, the seating unit 76b may have as a bar shape, and thus, a speckle pattern for authenticating the object 200 may be detected while the object 200 is in contact with the seating unit 76b. The cradle 76 may be fixedly formed on a surface of the speckle-based authentication apparatus 70 to be integrated with the speckle-based authentication apparatus 70, or may be formed attachable to and detachable from the speckle-based authentication apparatus 70.

The speckle-based authentication apparatus that uses a speckle, the authentication system that includes the speckle-based authentication apparatus and the authentication method according to the exemplary current embodiment may be applied to various devices, products, and facilities. For example, the speckle-based authentication apparatus, the authentication system, and the authentication method according to the current embodiment may be applied to mobile devices, such as wearable devices, mobile phones, tablets, smart cards, storages, radio-frequency identification (RFID) devices, home network systems, gates, and cashiers. The speckle-based authentication apparatus, the authentication system, and the authentication method according to the current embodiment may be applied to various fields besides the devices described above.

Figure 8:
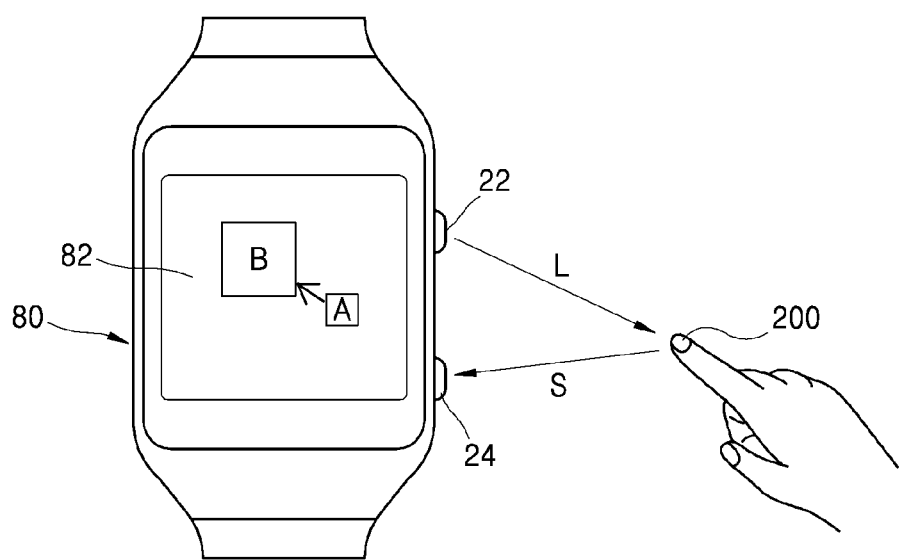
FIG. 8 is a schematic drawing of a wearable device that includes a speckle-based authentication apparatus that uses a speckle and an authentication system according to an exemplary embodiment.

FIG. 8 is a schematic drawing of a wearable device 80 that includes a speckle-based authentication apparatus that uses a speckle and an authentication system according to an exemplary embodiment.

Referring to FIG. 8, the wearable device 80 may include an optical source 22 that radiates light L onto the object 200 and a detector 24 that detects a speckle pattern generated from the object 200. The detector 24 may obtain not only a speckle pattern of the object 200 but also obtain distance information of the object 200. The wearable device 80 may include a controller 130 and a storage 150 that are included in the authentication system 100 of FIG. 1. For example, the controller 130 may determine a distance S between the object 200 and the detector 24 and perform user authentication based on the detected speckle pattern only when the determined distance S is within a predetermined threshold distance range B. The controller 130 may set the threshold distance range B in accordance with a security level for the user authentication. For example, when the security level is set as a high level, the threshold distance range B may reduce in comparison with the size of the threshold distance range B when the security level is set as a medium or low level. If the controller 130 determines that the object 200 is not placed within the threshold distance range B, the controller 130 may control the display 82 to display information about the current position A of the object 200 in relation to the threshold distance range B. Further, the display 82 may display a graphical element (e.g., arrow) that indicates a direction in which the object 200 is to be moved in order to initiate the user authentication process. A speckle pattern of the object 200 detected through the detector 24 may be compared with a speckle pattern that is stored in the storage and includes distance information from the detector 24 to the object 200. The speckle pattern detected from the object 200 and the speckle pattern stored in the wearable device 80 are compared, and a resulting value may be shown on a display 82. Information regarding the authentication results whether an object is authenticated or not may be visually, acoustically, and tactilely provided to a user.

As described above, in the speckle-based authentication apparatus having a relatively simple configuration, according to the one or more of the above exemplary embodiments, a detected speckle pattern is compared with a speckle pattern stored in advance in consideration of a distance to an object. Thus, a speckle-based authentication apparatus, an authentication system, and an authentication method having high reliability may be provided. The speckle-based authentication apparatus and the authentication system may be applied to various kinds of devices and apparatuses. The possibility to leak personal information may be reduced by using a speckle pattern instead of directly using biometric information, such as fingerprint of a body.

The foregoing exemplary embodiments and advantages are merely exemplary and are not to be construed as limiting. The present teaching can be readily applied to other types of apparatuses. For example, it will be understood that the speckle-based authentication apparatus that uses a speckle, the authentication system, and an authentication method may be applied to various devices, apparatuses, or products. The description of the exemplary embodiments is intended to be illustrative, and not to limit the scope of the claims, and many alternatives, modifications, and variations will be apparent to those skilled in the art.

What is claimed is:

1. A speckle-based authentication apparatus comprising:
    an optical source configured to radiate light onto an object that is placed apart from the optical source;
    a detector configured to detect a speckle pattern generated from the object in response to the light being radiated onto the object; and
    a controller configured to determine a distance between the object and the detector based on a distance between the optical source and the detector, an angle between a first line connecting the optical source to the detector and a second line connecting the optical source to the object, and an angle between the first line and a third line connecting the detector to the object.

2. The speckle-based authentication apparatus of claim 1, wherein the optical source is further configured to control a radiation angle of the light radiated onto the object from the optical source.

3. The speckle-based authentication apparatus of claim 1, wherein the optical source comprises a plurality of optical sources.

4. The speckle-based authentication apparatus of claim 3, wherein the plurality of optical sources comprise a first optical source and a second optical sources that respectively radiate a first light of a first wavelength and a second light of a second wavelength that is different from the first wavelength.

5. The speckle-based authentication apparatus of claim 1, wherein the detector comprises a plurality of detectors.

6. The speckle-based authentication apparatus of claim 1, wherein the optical source comprises a first optical source and a second optical source and the detector comprises a first detector and a second detector,
    wherein the first detector is configured to detect a first speckle pattern generated from the object in response to light emitted from the first optical source being incident onto the object, and the second detector is configured to detect a second speckle pattern generated from the object in response to light emitted from the second optical source being incident onto the object.

7. The speckle-based authentication apparatus of claim 1, wherein the detector further comprises a lens.

8. The speckle-based authentication apparatus of claim 1, further comprising a cradle on which the object is to be seated.

9. The speckle-based authentication apparatus of claim 8, wherein the cradle comprises:
    a height controller that controls a separation distance from the optical source or the detector to the object; and
    a seating unit on which the object is to be seated.

10. The speckle-based authentication apparatus of claim 1, wherein the authentication apparatus is attachable to and detachable from a cradle on which the object is to be seated.

11. The speckle-based authentication apparatus of claim 1, wherein the optical source radiates light having a coherent wave.

12. The authentication apparatus of claim 1, wherein the detector comprises a photo diode, a charge-coupled device, or a complementary metal-oxide semiconductor (CMOS) image sensor.

13. An authentication system that comprises the speckle-based authentication apparatus of claim 1.

14. The authentication system of claim 13, further comprising:
    a storage configured to store the speckle pattern detected by the detector or a value of a comparison result between the detected speckle pattern and a speckle pattern obtained in advance.

15. The authentication system of claim 14, further comprising a display configured to visually display the detected speckle pattern or output the comparison result between the detected speckle pattern and the speckle pattern obtained in advance.

16. A method of authenticating an object, comprising:
    radiating light, by an optical source, onto an object that is placed apart from the optical source;
    detecting, by a detector, a speckle pattern generated from the object in response to the light being radiated onto the object;
    determining, by a controller, a distance between the object and the detector based on a distance between the optical source and the detector, an angle between a first line connecting the optical source to the detector and a second line connecting the optical source to the object, and an angle between the first line and a third line connecting the detector to the object; and
    performing, by the controller, user authentication based on the detected speckle pattern in response to the determined distance being within a threshold distance range.

17. The method of claim 16, wherein the performing the user authentication comprises comparing the detected speckle pattern and a stored speckle pattern in response to the distance between the object and the detector being substantially the same as a distance corresponding to the stored speckle pattern.

18. The method of claim 16, wherein the radiating the light comprises radiating the light onto the object while changing an radiation angle of the optical source.

19. The method of claim 16, wherein the detected speckle pattern includes a first speckle pattern that is generated from the object in response to light being emitted from a first optical source of the optical source and being detected by a first detector of the detector, and the detected speckle pattern includes a second speckle pattern that is generated from the object in response to light being emitted from a second optical source of the optical source and being detected by a second detector of the detector.

20. The user authentication apparatus of claim 1, wherein the controller is configured to set the threshold distance range in accordance with a security level for the user authentication.

21. The user authentication apparatus of claim 1, further comprising a display configured to display a position of the object in relation to the threshold distance range.

* * * * *